United States Patent
Watanabe

(10) Patent No.: US 9,484,836 B2
(45) Date of Patent: Nov. 1, 2016

(54) INVERTER THAT CONVERTS DC POWER INTO AC POWER

(71) Applicant: SANYO ELECTRIC CO., LTD., Osaka (JP)

(72) Inventor: Keisuke Watanabe, Gifu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 396 days.

(21) Appl. No.: 14/089,713

(22) Filed: Nov. 25, 2013

(65) Prior Publication Data

US 2014/0077601 A1 Mar. 20, 2014

Related U.S. Application Data

(63) Continuation of application No. PCT/JP2012/004225, filed on Jun. 29, 2012.

(30) Foreign Application Priority Data

Jun. 30, 2011 (JP) ................................ 2011-146741

(51) Int. Cl.
H02M 7/493 (2007.01)
H02M 7/483 (2007.01)

(52) U.S. Cl.
CPC ............. *H02M 7/493* (2013.01); *H02M 7/483* (2013.01); *Y10T 307/549* (2015.04)

(58) Field of Classification Search
USPC ........................................................ 307/106
See application file for complete search history.

(56) References Cited

U.S. PATENT DOCUMENTS 4,685,043 A * 8/1987 Mehnert ............... H02M 7/501
307/66
2011/0089765 A1 4/2011 Iwata et al.

FOREIGN PATENT DOCUMENTS

| JP | 2000-152661 A | 5/2000 |
|---|---|---|
| JP | 2005-080414 A | 3/2005 |
| JP | 2011-083170 A | 4/2011 |
| KR | 10-2005-0097648 A | 10/2005 |
| KR | 10-2009-0025908 A | 11/2009 |
| WO | 2009/116273 A1 | 9/2009 |
| WO | 2011/025029 A1 | 3/2011 |

OTHER PUBLICATIONS

International Search Report issued in International Application No. PCT/JP2012/004225 with Date of mailing Aug. 28, 2012.

* cited by examiner

*Primary Examiner* — Robert Deberadinis
(74) *Attorney, Agent, or Firm* — McDermott Will & Emery LLP

(57) ABSTRACT

An inverter converts a direct-current (DC) power supplied from different DC power supplies into an alternate-current (AC) power formed by a quasi sinusoidal wave and then outputs the thus converted AC power. A first absolute-value setting switch to a fourth absolute-value setting switch are switched to generate absolute values of AC power by using a combination of a power-supply voltage supplied from each DC power supply and a voltage generated from a voltage supplied from each DC power supply. A first polarity setting switch to a fourth polarity setting switch are switched to generate the polarities of AC power. A control unit controls the switching of the first absolute-value setting switch and the like and the first polarity setting switch and the like. The control unit switches the first polarity switching switch and the like with timing at which the polarity of quasi sinusoidal wave changes.

7 Claims, 13 Drawing Sheets

FIG.5

| GRADATION LEVEL | S11 | S12 | S3 | S4 | S21 | S22 |
|---|---|---|---|---|---|---|
| 0 | OFF | OFF | ON | ON | OFF | OFF |
| 1 | OFF | OFF | OFF | ON | ON | OFF |
| 2 | ON | OFF | OFF | OFF | OFF | ON |
| 3 | ON | OFF | OFF | ON | OFF | OFF |
| −1 | OFF | OFF | ON | OFF | OFF | ON |
| −2 | OFF | ON | OFF | OFF | ON | OFF |
| −3 | OFF | ON | ON | OFF | OFF | OFF |

FIG.7

| GRADATION LEVEL | SW0 | SW1 | SW2 | SW3 | SW4 | SW5 | SW6 | SW7 |
|---|---|---|---|---|---|---|---|---|
| 0 | OFF | ON | OFF | ON | OFF | OFF | OFF | OFF |
| 1 | OFF | OFF | OFF | ON | OFF | ON | OFF | OFF |
| 2 | ON | OFF | OFF | OFF | OFF | OFF | ON | OFF |
| 3 | ON | OFF | OFF | ON | OFF | OFF | OFF | OFF |

FIG.10

| ABSOLUTE VALUE OF GRADATION | Q0 | Q3 | Q5 | Q6 |
|---|---|---|---|---|
| 0 | OFF | OFF | ON | ON |
| 1 | OFF | ON | ON | OFF |
| 2 | ON | OFF | OFF | ON |
| 3 | ON | ON | OFF | OFF |

20

INVERTER THAT CONVERTS DC POWER INTO AC POWER

RELATED APPLICATIONS

This application is Continuation Application of International Application No. PCT/JP2012/004225, filed on Jun. 29, 2012, which in turn claims the benefit of Japanese Application No. 2011-146741, filed on Jun. 30, 2011, the disclosures of which are incorporated by reference herein.

BACKGROUND OF THE INVENTION

1. Field of the Invention

The present disclosure relates to an inverter that converts direct-current (DC) power into alternate-current (AC) power.

2. Description of the Related Art

As compared with the conventional PWM (Pulse Width Modulation) inverters, a gradationally controlled inverter capable of reducing the switching losses has been developed in recent years and is in practical use today. The gradationally controlled inverter is comprised of a plurality of inverters having a binary or ternary voltage relationships with one another, and it generates quasi sinusoidal waves by combining different output voltages outputted from the respective plurality of inverters.

SUMMARY OF THE INVENTION

It is demanded that not only the conversion efficiency of an inverter be enhanced but also the cost of the inverter be reduced.

The present disclosure has been made in view of the foregoing circumstances, and one non-limiting and example provides a technology that achieves a low cost while suppressing the deterioration in the conversion efficiency of the inverter.

In order to resolve the above-described problems, an inverter according to one example converts a direct-current (DC) power supplied from each of a plurality of mutually different DC power supplies into an alternate-current (AC) power formed by a quasi sinusoidal wave and outputs the thus converted AC power, and the inverter includes: a plurality of switches of first type configured to be switched to generate an absolute value of AC power by using a combination of a power-supply voltage supplied from each DC power supply and a voltage generated from a voltage supplied from each DC power supply; a plurality of switches of second type configured to be switched to generate a polarity of AC power; and a control unit configured to control the switching of the plurality of switches of first type and the plurality of switches of second type to generate a gradation voltage of quasi sinusoidal wave to be outputted. The control unit switches the plurality of switches of second type with timing at which the polarity of quasi sinusoidal wave changes, and the control unit keeps the plurality of switches of second type turned on, during the remaining time period of the quasi sinusoidal wave.

Additional benefits and advantages of the disclosed examples will be apparent from the specification and Figures. The benefits and/or advantages may be individually provided by the various examples and features of the specification and drawings, and need not all be provided in order to obtain one or more of the same.

These general and specific aspects may be implemented using a system, a method, and a computer program, and any combination of systems, methods, and computer programs.

BRIEF DESCRIPTION OF THE DRAWINGS

Examples will now be described by way of examples only, with reference to the accompanying drawings which are meant to be exemplary, not limiting and wherein like elements are numbered alike in several Figures in which:

FIG. 5 shows on/off states of switches when seven types of gradation levels are generated by the inverter shown in FIG. 1;

FIG. 7 shows on/off states of switches when four types of gradation levels are generated by the inverter shown in FIG. 6;

FIG. 10 shows on/off states of absolute-value setting switches when four types of absolute-value gradations are generated by the inverter shown in FIG. 8;

DETAILED DESCRIPTION

The present disclosure will now be described by reference to the examples. This does not intend to limit the scope of the present disclosure, but to exemplify the disclosure.

The inventor's knowledge underlying the present disclosure will be explained before the example are explained in detail. In recent years, solar power generation systems find quickly widening use. The solar power generation system requires the installation of a power conditioner to make efficient use of the power generated by a solar cell module. An inverter for converting direct-current (DC) power into alternate-current (AC) power is installed in the power conditioner. In order to get more power by the solar power generation system, it is important to improve the energy conversion efficiency of solar cells and also improve the power conversion efficiency of the power conditioner. An inverter having reduced higher harmonics and reduced power loss is needed in order to connect the power condition to the system.

To improve the conversion efficiency of the inverter, it is suitable to use a high-performance MOSFET (Metal-Oxide-Semiconductor Field-Effect Transistor) as a plurality of switches constituting the inverter. The high-performance MOSFET is characterized by a high breakdown voltage, high speed switching, and low loss. However, as the performance of the MOSFET becomes higher, overall cost tends to increase. Thus, the cost of the inverter gets higher with a higher performance of MOSFET.

To clarify the description of examples of the present disclosure, an operating principle and comparative examples will be explained before the examples thereof are explained in detail. Then the examples will be explained.

(Operating Principle)

Figure 1:
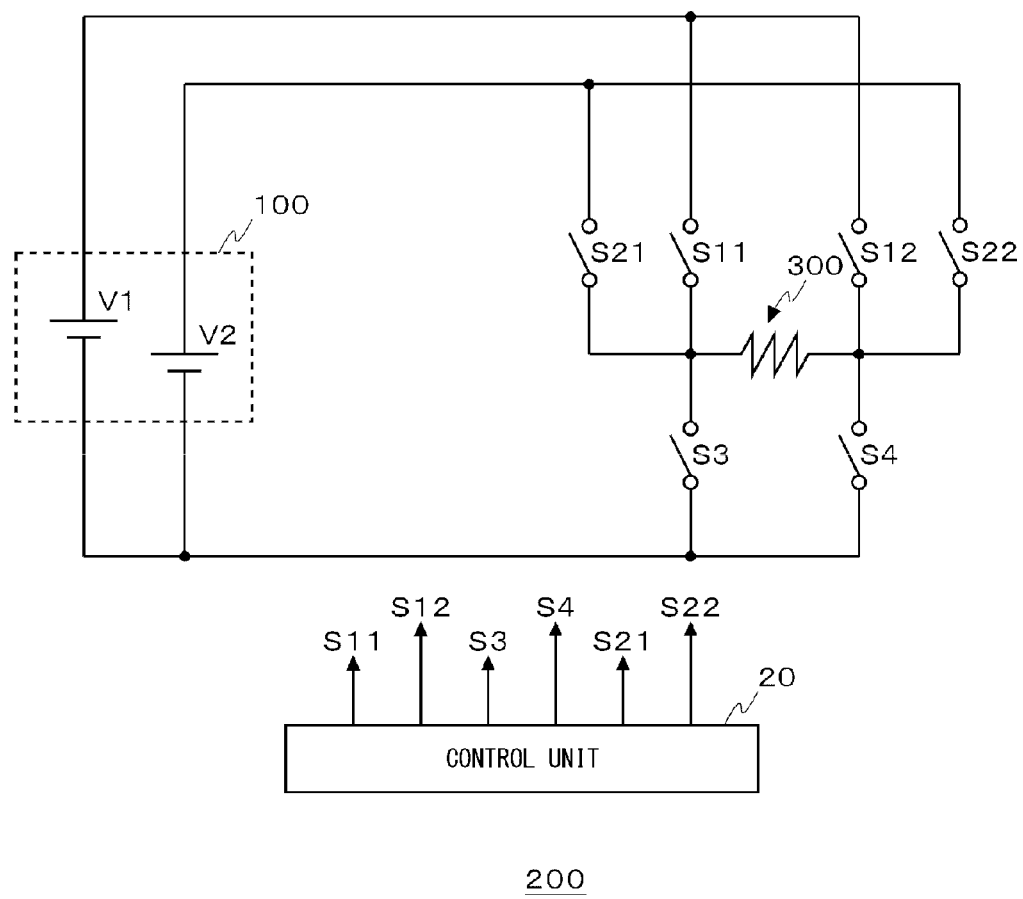
FIG. 1 shows a circuit configuration of an inverter according to an operating principle of the present disclosure.

FIG. 1 shows a circuit configuration of an inverter 200 according to the operating principle of the present disclosure. For the ease of explanation, a DC power supply unit 100 and a load 300 are also depicted in FIG. 1 but the DC power supply unit 100 and the load 300 are not included in the structural components of the inverter 200. The inverter 200 converts DC power, supplied from a plurality of DC power supplies included in the DC power supply unit 100, into AC power, formed by quasi sinusoidal waves, and then outputs the AC power. The DC power supply unit 100 includes a first DC power supply V1 and a second DC power supply V2, which have mutually different power-supply voltages, respectively. The inverter 200 is provided with a plurality of H-bridge circuits and a control unit 20. The control unit 20 generates a quasi sinusoidal wave by using the power-supply voltages from the first DC power supply V1 and the second DC power supply V2, respectively, and a differential voltage between these two DC power-supply voltages (hereinafter referred to as "potential difference" also).

A plurality of H-bridge circuits are provided for a plurality of DC power supplies having mutually different voltages, respectively. And the H-bridge circuit is a circuit used to supply a forward voltage and a reverse voltage to the load 300 from each of the plurality of DC power supplies. The control unit 20 generates the quasi sinusoidal wave by controlling the plurality of H-bridge circuits.

A more specific description is now given hereunder. Since two types of DC power supplies (i.e., the first DC power supply V1 and the second DC power supply V2) are provided here, the inverter 200 is provided with two H-bridge circuits. Also, assume herein that the inverter 200 is designed based on the operating principle in a manner such that a power-supply voltage E1 of the first DC power supply V1 is greater than a power-supply voltage E2 of the second DC power supply V2 (i.e., E1>E2).

A first H-bridge circuit is a circuit used to supply the forward voltage and the reverse voltage from the first DC power supply V1 to the load 300. The first H-bridge is provided with a 1-1st switch S11, a 1-2nd switch S12, a first common switch S3, and a second common switch S4. The 1-1st switch S11 and the 1-2nd switch S12 are provided in parallel with each other between a high potential side of the first DC power supply V1 and the load 300. The first common switch S3 and the second common switch S4 are provided in parallel with each other between a low potential side of the first DC power supply V1 and the load 300.

More specifically, the 1-1st switch S11 is inserted into a path that connects a high-potential-side terminal of the first DC power supply V1 and a high-potential-side terminal of the load 300. The 1-2nd switch S12 is inserted into a path that connects the high-potential-side terminal of the first DC power supply V1 and a low-potential-side terminal of the load 300. The first common switch S3 is inserted into a path that connects a low-potential-side terminal of the first DC power supply V1 and the high-potential-side terminal of the load 300. The second common switch S4 is inserted into a path that connects the low-potential-side terminal of the first DC power supply V1 and the low-potential-side terminal of the load 300.

When the forward voltage is applied from the first DC power supply V1 to the load 300, the first H-bridge circuit is controlled such that both the 1-1st switch S11 and the second common switch S4 are turned on and the 1-2nd switch S12 and the first common switch S3 are turned off by the control unit 20. When, on the other hand, the backward voltage is applied from the first DC power supply V1 to the load 300, control is performed such that the 1-1st switch S11 and the second common switch S4 are turned off and the 1-2nd switch S12 and the first common switch S3 are turned on.

The second H-bridge circuit is a circuit used to supply the forward voltage and the backward voltage from the second DC power supply V2 to the load 300. The second H-bridge circuit is provided with a 2-1st switch S21, a 2-2nd switch S22, the first common switch S3, and the second common switch S4. The 2-1st switch S21 and the 2-2nd switch S22 are provided in parallel with each other between a high potential side of the second DC power supply V2 and the load 300. The first common switch S3 and the second common switch S4 are provided in parallel with each other between a low potential side of the second DC power supply V2 and the load 300.

The detailed connection relationships and on/off operations of the 2-1st switch S21, the 2-2nd switch S22, the first common switch S3 and the second common switch S4 included in the second H-bridge circuit are similar to those of the 1-1st switch S11, the 1-2nd switch S12, the first common switch S3 and the second common switch S4 included in the first H-bridge circuit. Thus the repeated description thereof is omitted here. A power MOSFET, IGBT (Insulated Gate Bipolar Transistor), GaN transistor, SiC-FET or the like may be used for the 1-1st switch S11, the 1-2nd switch S12, the 2-1st switch S21, the 2-2nd switch S22, the first common switch S3, and the second common switch S4.

The control unit 20 generates the quasi sinusoidal wave by controlling the first H-bridge circuit and the second H-bridge circuit. More specifically, the control unit 20 switches the voltages supplied to the load 300 in time division by controlling the first H-bridge circuit and the second H-bridge circuit. As the number of voltages (hereinafter referred to as the "number of gradations" also, in this patent specification) becomes larger, a smoother sinusoidal wave will be generated. The inverter 200, which uses the two DC power supplies and the two H-bridge circuits, can generate four types of positive and negative voltages altogether (i.e., E1, E2, −E2, and −E1). If a zero voltage, where no voltage is being supplied to the load 300, is added to the aforementioned four types of voltages, the total of five types of voltages can be generated. In the present example, further different two types of voltages are generated without increasing the number of DC power supplies and the number of H-bridge circuits. Thus, seven types of voltages are generated altogether.

A description is now given of a method for generating the further different two types of voltages. The control unit 20 disables the two low-potential-side paths that constitute the first H-bridge circuit, and disables the two low-potential-side paths that constitute the second H-bridge circuit. That is, the control unit 20 performs control such that the first common switch S3 and the second common switch S4 are turned off. Also, the control unit 20 enables two high-potential-side paths that constitute the first H-bridge circuit, and enables two high-potential-side paths that constitute the second H bridge circuit. This forms a different H-bridge circuit (hereinafter referred to as "first/second H-bridge circuit"). In other words, the first/second H-bridge circuit is a circuit where a half of the high potential side of the first H-bridge circuit is combined with a half of the high potential side of the second H-bridge circuit.

This first/second H-bridge circuit is a circuit that supplies a potential difference between the first DC power supply V1 and the second DC power supply V2 to the load 300 in the forward direction and the reverse direction. The first/second H-bridge circuit includes the 1-1st switch S11, the 1-2nd switch S12, the 2-1st switch S21, and the 2-2nd switch S22.

Figure 2:
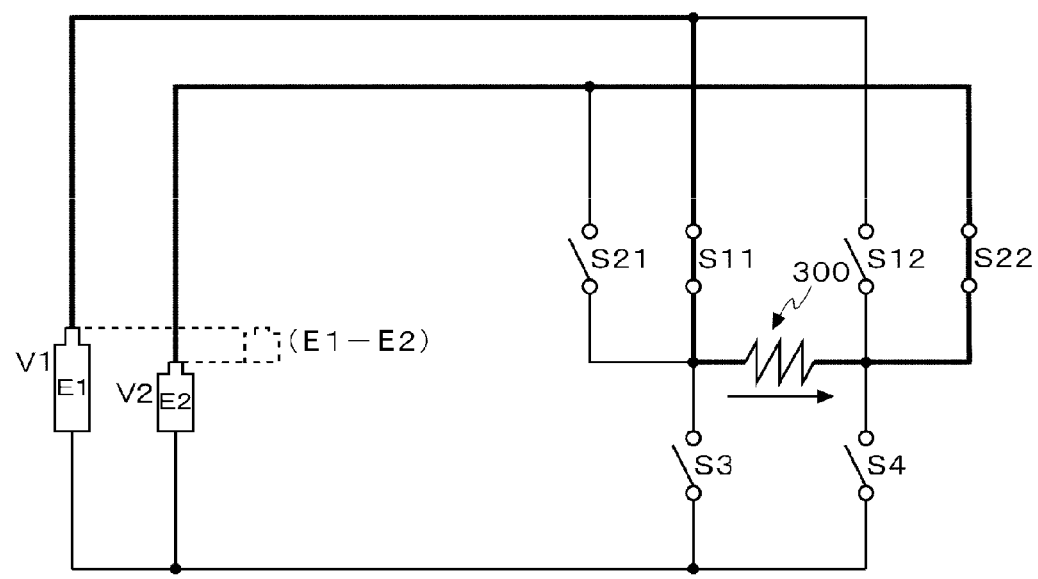
FIG. 2 shows a state in which a forward voltage is supplied to a load by a first/second H-bridge circuit.
Figure 3:
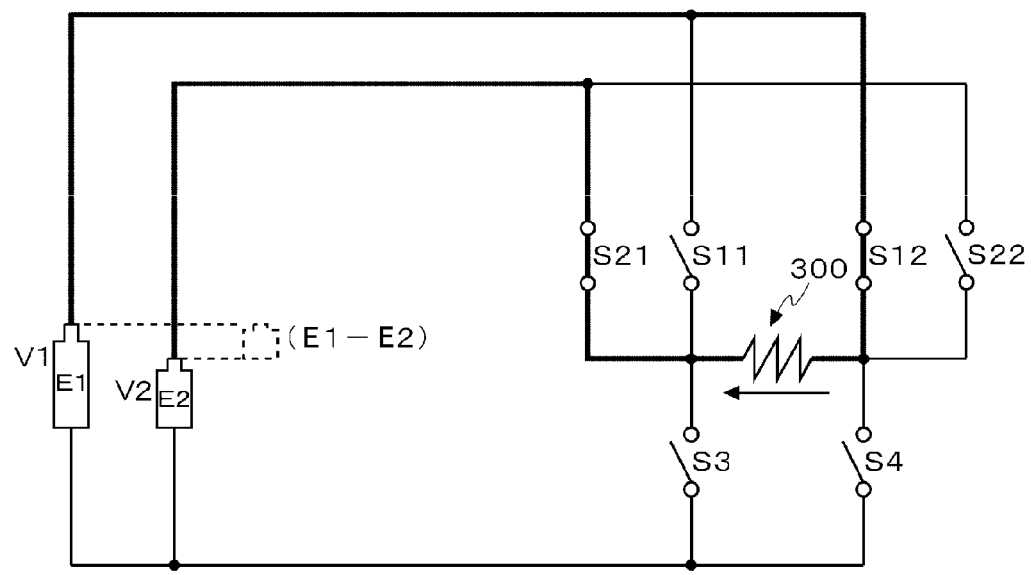
FIG. 3 shows a state in which a reverse voltage is supplied to a load by a first/second H-bridge circuit.

FIG. 2 shows a state in which a forward voltage is supplied to the load 300 by the first/second H-bridge circuit. FIG. 3 shows a state in which a reverse voltage is supplied to the load 300 by the first/second H-bridge circuit. In each of FIG. 2 and FIG. 3, a path indicated by a thick line is the path through which the current flows. In FIG. 2, the control unit 20 performs control such that the 1-1st switch S11 and the 2-2nd switch S22 are turned on and the 1-2nd switch S12, the 2-1st switch S21, the first common switch S3 and the second common switch S4 are turned off. Thereby, the potential difference (E1−E2) between the first DC power supply V1 and the second DC power supply V2 can be supplied to the load 300 in the forward direction.

In FIG. 3, the control unit 20 performs control such that the 1-2nd switch S12 and the 2-1st switch S21 are turned on and the 1-1st switch S11, the 2-2nd switch S22, the first common switch S3 and the second common switch S4 are turned off. Thereby, the potential difference (E1−E2) between the first DC power supply V1 and the second DC power supply V2 can be supplied to the load 300 in the reverse direction. As described above, the control unit 20 generates seven types of voltages by using the power-supply voltage E1 from the first DC power supply V1, the power-supply voltage E2 from the second DC power supply V2 and the potential difference (E1−E2) between the power-supply voltage E1 and the power-supply voltage E2 so as to generate a quasi sinusoidal wave.

Figure 4:
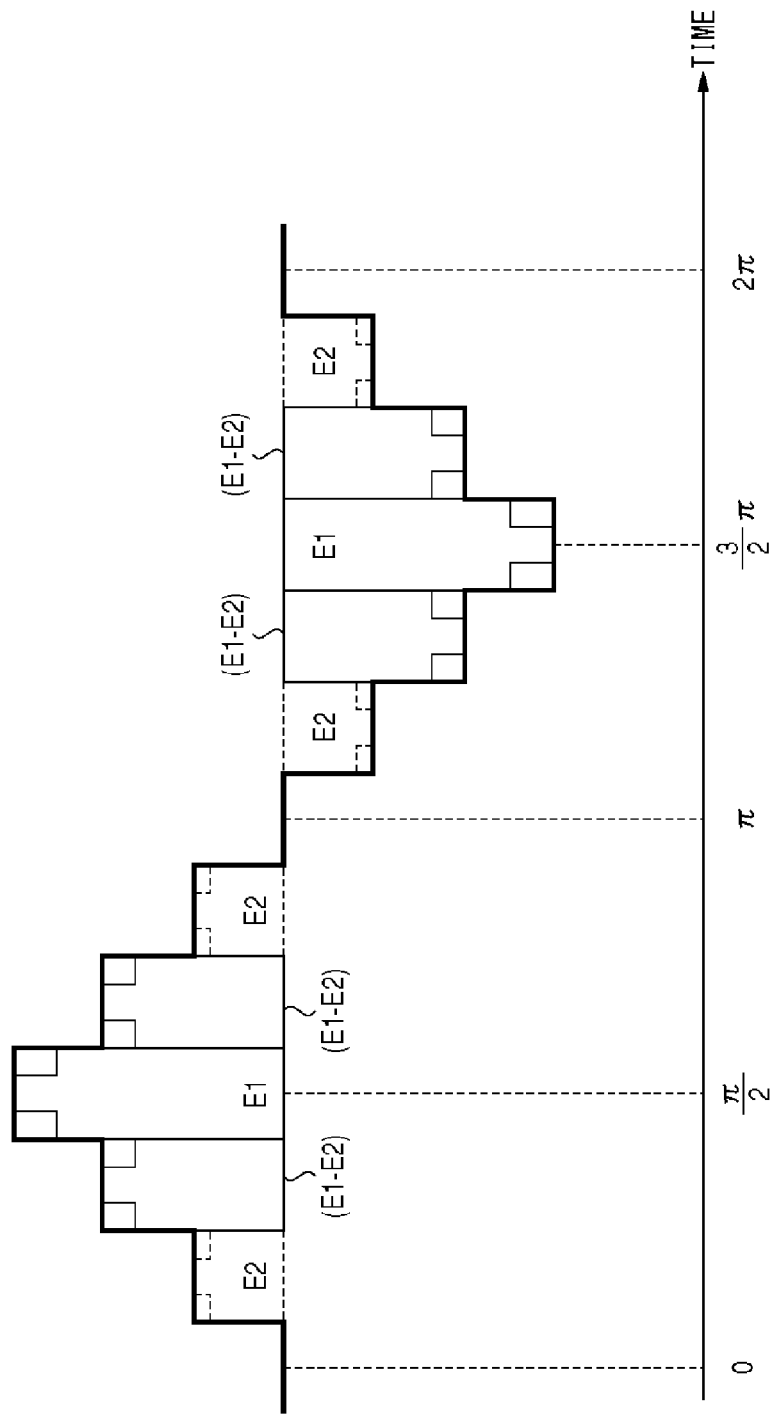
FIG. 4 shows a quasi sinusoidal wave generated by the inverter shown in FIG. 1.

FIG. 4 shows a quasi sinusoidal wave generated by the inverter 200. As described above, the seven types of voltages can be generated by the operating principle. The control unit 20 generates a quasi sinusoidal wave by switching the voltages to be supplied to the load 300 in the following order. That is, the zero voltage, the voltage E2 (positive) of the second DC power supply V2, the aforementioned potential difference (E1−E2) (positive), the voltage E1 (positive) of the first DC power supply V1, the aforementioned potential difference (E1−E2) (positive), the voltage E2 (positive) of the second DC power supply V2, the zero voltage, the voltage E2 (negative) of the second DC power supply V2, the aforementioned potential difference (E1−E2) (negative), the voltage E1 (negative) of the first DC power supply V1, the aforementioned potential difference (E1−E2) (negative), the voltage E2 (negative) of the second DC power supply V2, and the zero voltage are switched in this order so as to generate the quasi sinusoidal wave.

In this manner, the control unit 20 changes an output voltage in the order of the zero voltage, the voltage E2, the potential difference (E1−E2) and the voltage E1 during a time period from phase 0 to phase $\pi/2$ of an AC output, namely in a ¼ cycle. Subsequently, the control unit 20 changes the output voltage in the order of the voltage E1, the potential difference (E1−E2), the voltage E2 and the zero voltage during a time period from phase $\pi/2$ to phase $\pi$ of the AC output. Subsequently, the control unit 20 changes the output voltage in the order of the zero voltage, the voltage (−E2), the potential difference (E2−E1) and the voltage (−E1) during a time period from phase $\pi$ to phase $3\pi/2$ of the AC output. Subsequently, the control unit 20 changes the output voltage in the order of the voltage (−E1), the potential difference (E2−E1), the voltage (−E2) and the zero voltage during a time period from phase $3\pi/2$ to phase $2\pi$ of the AC output. In this manner, the control unit 20 generates the quasi sinusoidal wave.

When, for example, the ratio of the voltage E1 of the first DC power supply V1 to the voltage E2 of the second DC power supply V2 is set to 3:1, the ratio between the voltage E1 of the first DC power supply V1, the aforementioned potential difference (E1−E2) and the voltage E2 of the second DC power supply V2 can be set to 3:2:1. In this manner, a smoother quasi sinusoidal wave can be produced by setting the difference of each gradation equal or reducing the difference thereof.

FIG. 5 shows on/off states of switches when the seven types of gradation levels are generated by the inverter 200. Gradation level "0" corresponds to the aforementioned zero voltage. Gradation level "1" corresponds to the voltage E2 (positive) of the second DC power supply V2. Gradation level "2" corresponds to the potential difference (E1−E2) (positive). Gradation level "3" corresponds to the voltage E1 (positive) of the first DC power supply V1. Gradation level "−1" corresponds to the voltage E2 (negative) of the second DC power supply V2. Gradation level "−2" corresponds to the potential difference (E1−E2) (negative). Gradation level "−3" corresponds to the voltage E1 (negative) of the first DC power supply V1. As shown in FIG. 5, the control unit 20 controls the on and off of the 1-1st switch S11, the 1-2nd switch S12, the first common switch S3, the second common switch S4, the 2-1st switch S21 and the 2-2nd switch S22.

Referring back to FIG. 1, the current flows through the 2-1st switch S21 and the 2-2nd switch in both directions. Thus, a bidirectional switching device needs to be used for the 2-1st switch S21 and the 2-2nd switch. A power MOSFET compatible with bidirectional switching may be used, for instance. Or alternatively, a bidirectional switching device may be configured by arranging two unidirectional power MOSFETs in series or parallel with each other. On the other hand, the current flows through the 1-1st switch S11, the 1-2nd switch S12, the first common switch S3 and the second common switch S4 in one direction only. Thus, a commonly-used unidirectional switching element can be used for the 1-1st switch S11, the 1-2nd switch S12, the first common switch S3 and the second common switch S4.

The switches, through which the current flows bidirectionally, correspond to switches inserted into two low-potential-side paths, respectively, which form the first/second H-bridge circuit (i.e., the switches inserted into the two-high-potential-side paths, respectively, which form the second H-bridge circuit). In other words, the directions of current in the 2-1st switch S21 and the 2-2nd switch S22 differ in the cases between when the second H-bridge circuit is formed and when the first/second H-bridge circuit is formed. Here, the 2-1st switch S21 and the 2-2nd switch S22 are respectively inserted into the two paths that connect the second DC power supply V2, whose voltage is the lower of the first DC power supply V1 and the second DC power supply, and the load 300.

Comparative Example

Figure 6:
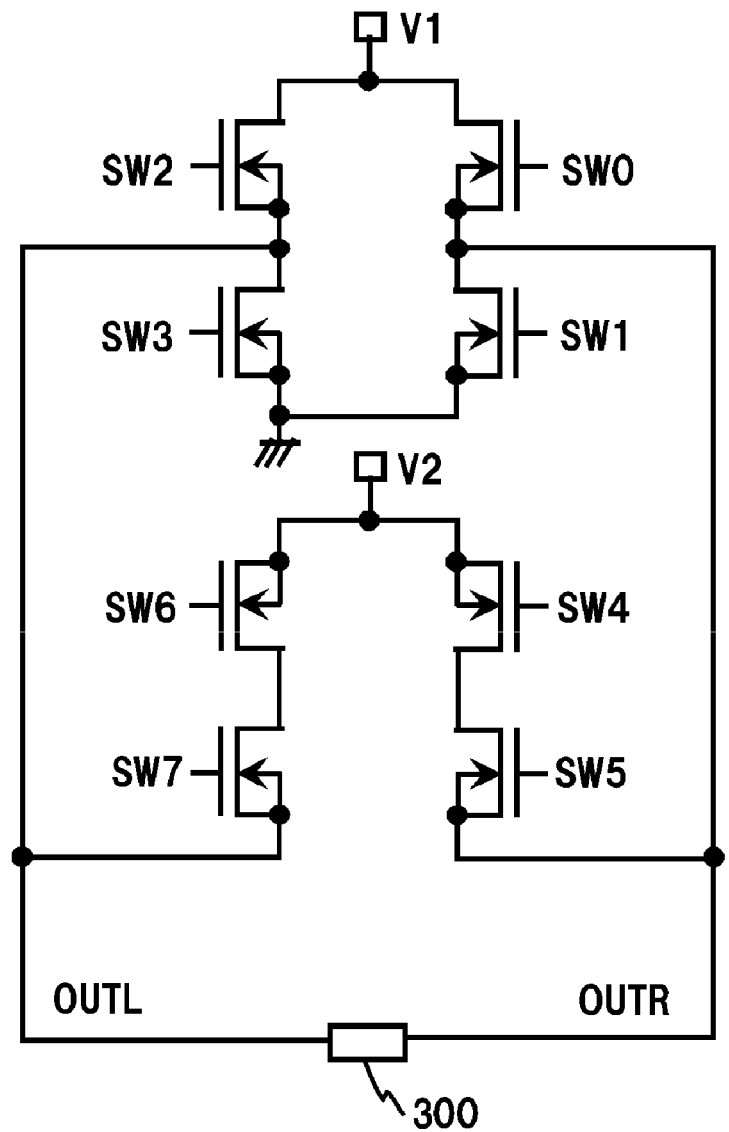
FIG. 6 is an implementation circuit of an inverter according to a comparative example of the present disclosure.

FIG. 6 is an implementation circuit of an inverter 210 according to a comparative example of the present disclosure. Comparing with FIG. 1, the 1-1st switch SW11 in FIG. 1 corresponds to a switch SW0 in FIG. 6. Similarly, the 1-2nd switch S12 in FIG. 1 corresponds to a switch SW2 in FIG. 6. The first common switch S3 in FIG. 1 corresponds to a switch SW1 in FIG. 6. The second common switch S4 in FIG. 1 corresponds to a switch SW3 in FIG. 6. The 2-1st switch S21 in FIG. 1 corresponds to a switch SW4 and a switch SW5 in FIG. 6. The 2-2nd switch S22 in FIG. 1 corresponds to a switch SW6 and a switch SW7 in FIG. 6. Although the left-to-right direction is set as the forward direction in FIG. 1, the right-to-left direction is set, for the ease of explanation, as the forward direction in FIG. 6.

FIG. 7 shows on/off states of switches when four types of gradation levels are generated by the inverter 210. Gradation level "0" corresponds to the zero voltage. Gradation level "1" corresponds to the voltage E2 (positive) of the second DC power supply V2. Gradation level "2" corresponds to the potential difference (E1−E2) (positive). Gradation level "3" corresponds to the voltage E1 (positive) of the first DC power supply V1. As shown in FIG. 7, the control unit 20 controls the on and off of the switches SW0 to SW7.

It is to be noted here that a parasitic diode is formed between a source and a drain of each switch SW (power MOSFET). The switch SW7 used when the gradation "1" is generated and the switch SW4 used when the gradation "2" is generated are turned off in FIG. 7. This is because the current flows through the parasitic diode. Note that these switches SW may be turned on instead. However, for the purpose of reducing the switching loss, it is suitable, for example, that the current flows through the parasitic diode with these switches SW turned off.

Examples

Figure 8:
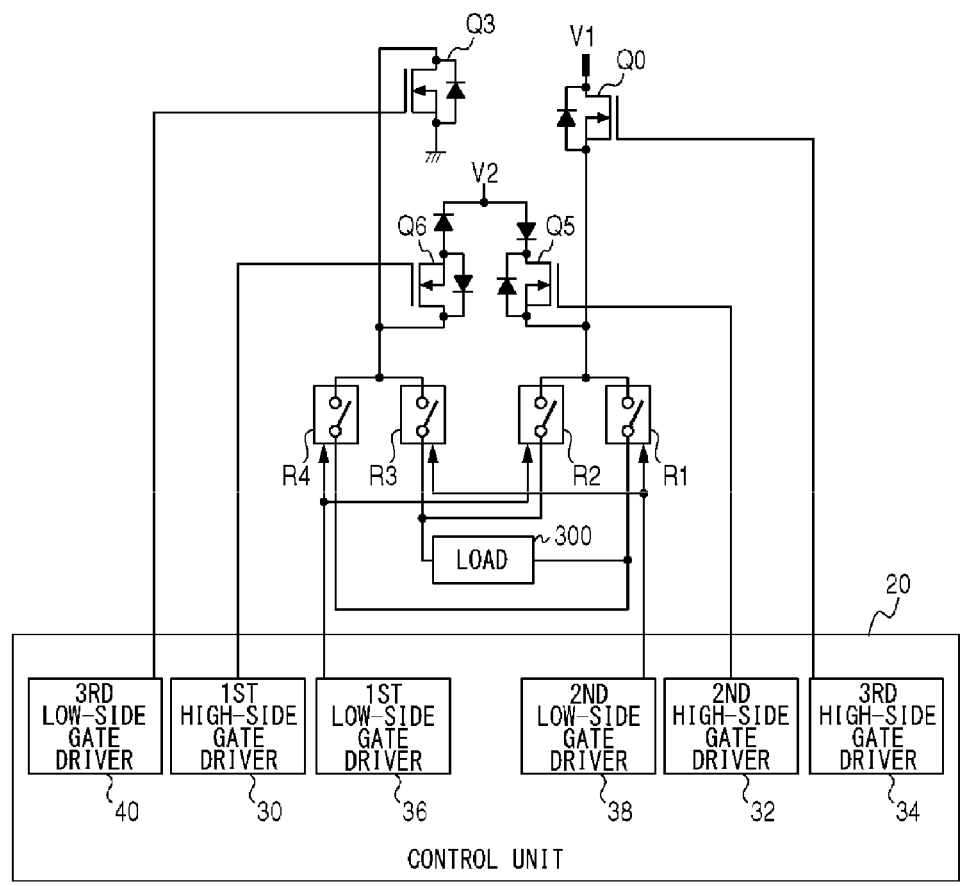
FIG. 8 is an implementation circuit of an inverter according to an example of the present disclosure.

FIG. 8 is an implementation circuit of an inverter 220 according to an example of the present disclosure. The implementation circuit of the present example, which operates similarly to the operating principle, differs from the comparative example in configuration. In the comparative example, a quasi sinusoidal wave is generated by the eight switches. In the present example, on the other hand, four switches out of the eight switches are used to generate amplitudes of a quasi sinusoidal wave, and the remaining four switches are used to generate polarities of the quasi sinusoidal wave. In other words, not all switches carry out the same processing but two different types of groups of switches carry out mutually different processings for different purposes.

A first absolute-value setting switch Q0, a second absolute-value setting switch Q3, a third absolute-value setting switch Q5 and a fourth absolute-value setting switch Q6 are switches used to generate the amplitudes of the quasi sinusoidal wave. In other words, these switches Q0, Q3, Q5 and Q6 are switched to generate absolute values of AC power by the use of power-supply voltages fed from the first DC power supply V1 and the second DC power supply V2 and the potential difference between the power-supply voltages. Note that the first absolute-value setting switch Q0, the second absolute-value setting switch Q3, the third absolute-value setting switch Q5 and the fourth absolute-value setting switch Q6 correspond to the switch SW0, the switch SW3, the switch SW5 and the switch SW6 in FIG. 6, respectively.

When the zero voltage, whose absolute value of a gradation level is "0", is to be generated, the third absolute-value setting switch Q5 and the fourth absolute-value setting switch Q6 are turned on. Hereinafter, the absolute value of a gradation level will be referred to as "absolute-value gradation" also. When the voltage E2 (positive), whose absolute-value gradation is "1", is to be generated, the third absolute-value setting switch Q5 and the second absolute-value setting switch Q3 are turned on. When the potential difference (E1−E2) (positive), whose absolute-value gradation is "2", is to be generated, the first absolute-value setting switch Q0 and the fourth absolute-value setting switch Q6 are turned on. When the voltage E1 (positive), whose absolute-value gradation is "3", is to be generated, the first absolute-value setting switch Q0 and the second absolute-value setting switch Q3 are turned on.

A first polarity setting switch R1, a second polarity setting switch R2, a third polarity setting switch R3 and a fourth polarity setting switch R4 are switches used to generate polarities of the quasi sinusoidal wave. That is, these switches R1 to R4 are switched to generate the polarities of AC power. When a positive polarity is to be generated, the first polarity setting switch R1 and the third polarity setting switch R3 are turned on. When a negative polarity is to be generated, the second polarity setting switch R2 and the fourth polarity setting switch R4 are turned on.

Figure 9:
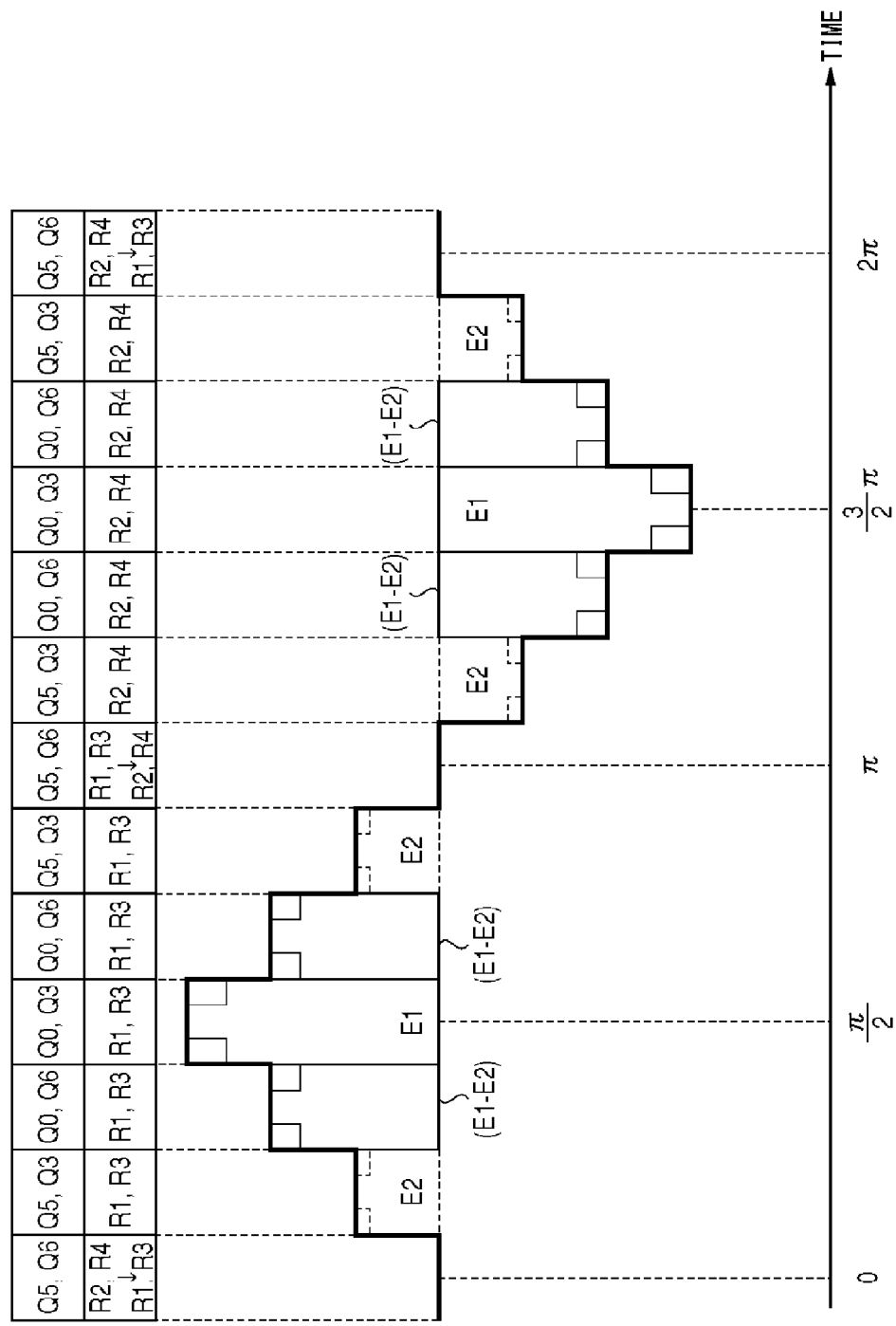
FIG. 9 shows a quasi sinusoidal wave generated by the inverter shown in FIG. 8.

To generate a gradation voltage of the quasi sinusoidal wave to be outputted from the inverter 220, the control unit 20 controls the switchings of the first absolute-value setting switch Q0, the second absolute-value setting switch Q3, the third absolute-value setting switch Q5, the fourth absolute-value setting switch Q6, the first polarity setting switch R1, the second polarity setting switch R2, the third polarity setting switch R3 and the fourth polarity setting switch R4. For the clarity of explanation, a description is given here of a switching process carried out by the control unit 20 with reference to FIG. 9. FIG. 9 shows switches, which are to be turned on, to generate the seven types of gradation levels generated by the inverter 220, and a quasi sinusoidal wave generated thereby. Similar to FIG. 4, the lower half of FIG. 9 shows a quasi sinusoidal wave with respect to time. The upper half of FIG. 9 shows switches that are to be turned on to achieve the respective amplitudes. The top row of the upper half of FIG. 9 shows switches that are turned on among the first absolute-value setting switch Q0, the second absolute-value setting switch Q3, the third absolute-value setting switch Q5 and the fourth absolute-value setting switch Q6. The bottom row of the upper half of FIG. 9 shows switches that are turned on among the first polarity setting switch R1, the second polarity setting switch R2, the third polarity setting switch R3 and the fourth polarity setting switch R4.

The relation between a switch that is turned on, among the first absolute-value setting switch Q0, the second absolute-value setting switch Q3, the third absolute-value setting switch Q5 and the fourth absolute-value setting switch Q6, and the absolute-value gradations is as described above. FIG. 10 shows on/off states of absolute-value setting switches when four types of absolute-value gradations are generated by the inverter 220. According to FIG. 9 and FIG. 10, the control unit 20 switches the first absolute-value setting switch Q0, the second absolute-value setting switch Q3, the third absolute-value setting switch Q5 and the fourth absolute-value setting switch Q6, during a ¼ cycle of an AC output, as follows. That is, the control unit 20 switches those switches Q0 to Q6 such that, during a ¼ cycle of the AC output, the output voltage changes in the order of the potential difference (0) between E2 and E2 both from the second DC power supply, the power-supply voltage E2, the potential difference (E1−E2) between the power-supply voltage E1 from the first DC power supply and the power-supply voltage E2, and the power-supply voltage E1. In particular, the third absolute-value setting switch Q5 continues to be turned when a change is made from the potential difference (0) to the power-supply voltage E2; the first absolute-value setting switch Q0 continues to be turned on when a change is made from the potential difference (E1− E2) to the power-supply voltage E1. In other words, the control unit 20 controls the switching so that the continuous ON-state at two positions can be achieved. Now refer back to FIG. 9.

The first polarity setting switch R1, the second polarity setting switch R2, the third polarity setting switch R3 and the fourth polarity setting switch R4 are switched with timing at which the polarity of sinusoidal wave changes. More specifically, the switching is made from the second polarity setting switch R2 and the fourth polarity setting switch R4 to the first polarity setting switch R1 and the third polarity setting switch R3, with the timing at which the polarity changes from a negative polarity to a positive polarity. Also, the switching is made from the first polarity setting switch R1 and the third polarity setting switch R3 to the second polarity setting switch R2 and the fourth polarity setting switch R4, with the timing at which the polarity changes from a positive polarity to a negative polarity. During the remaining time period of the quasi sinusoidal wave, the control unit 20 keeps the switches that have turned on. Thus, the switching is made only when an absolute-value gradation is small, namely, only when the amplitude is small.

As a result, the respective switching speeds of the first polarity setting switch R1, the second polarity setting switch R2, the third polarity setting switch R3 and the fourth polarity setting switch R4 may be lower than the respective switching speeds of the first absolute-value setting switch Q0, the second absolute-value setting switch Q3, the third absolute-value setting switch Q5 and the fourth absolute-value setting switch Q6. Also, the first polarity setting switch R1, the second polarity setting switch R2, the third polarity setting switch R3 and the fourth polarity setting switch R4 may be lower, in the breakdown voltage, than the first absolute-value setting switch Q0, the second absolute-value setting switch Q3, the third absolute-value setting switch Q5 and the fourth absolute-value setting switch Q6.

As a result, MOSFETs having lower specifications than the first absolute-value setting switch Q0, the second absolute-value setting switch Q3, the third absolute-value setting switch Q5 and the fourth absolute-value setting switch Q6 may be used for the first polarity setting switch R1, the second polarity setting switch R2, the third polarity setting switch R3 and the fourth polarity setting switch R4. By configuring the inverter 220 in this manner, slower and lower-cost switches can be used for the inverter 220 although the number of switches used in the inverter 220 is the same as that used in the inverter 210. Unidirectional switches may be used for the first absolute-value setting switch Q0, the second absolute-value setting switch Q3, the third absolute-value setting switch Q5, the fourth absolute-value setting switch Q6, the first polarity setting switch R1, the second polarity setting switch R2, the third polarity setting switch R3 and the fourth polarity setting switch R4.

The control unit 20 includes a first high-side gate driver 30, a second high-side gate driver 32, a third high-side gate driver 34, a first low-side gate driver 36, a second low-side gate driver 38, and a third low-side gate driver 40. The gate drivers 30 to 40 are each a gate driver used to apply a gate voltage to each switch. Not the high-side gate drivers but the low-side gate drivers can be used to switch the second absolute-value setting switch Q3 in addition to the first polarity setting switch R1, the second polarity setting switch R2, the third polarity setting switch R3 and the fourth polarity setting switch R4. Also, the gate drivers for the first polarity setting switch R1 and the third polarity setting switch R3 may be put to common use, and the gate drivers for the second polarity setting switch R2 and the fourth polarity setting switch R4 may be put to common use, as well. In this manner, the ratio of the number of high-side gate drivers used over the total number of gate drivers is reduced, and the total number of gate drivers used is also reduced. As a result, the cost of the gate drivers used for the inverter 220 is reduced.

Figure 11:
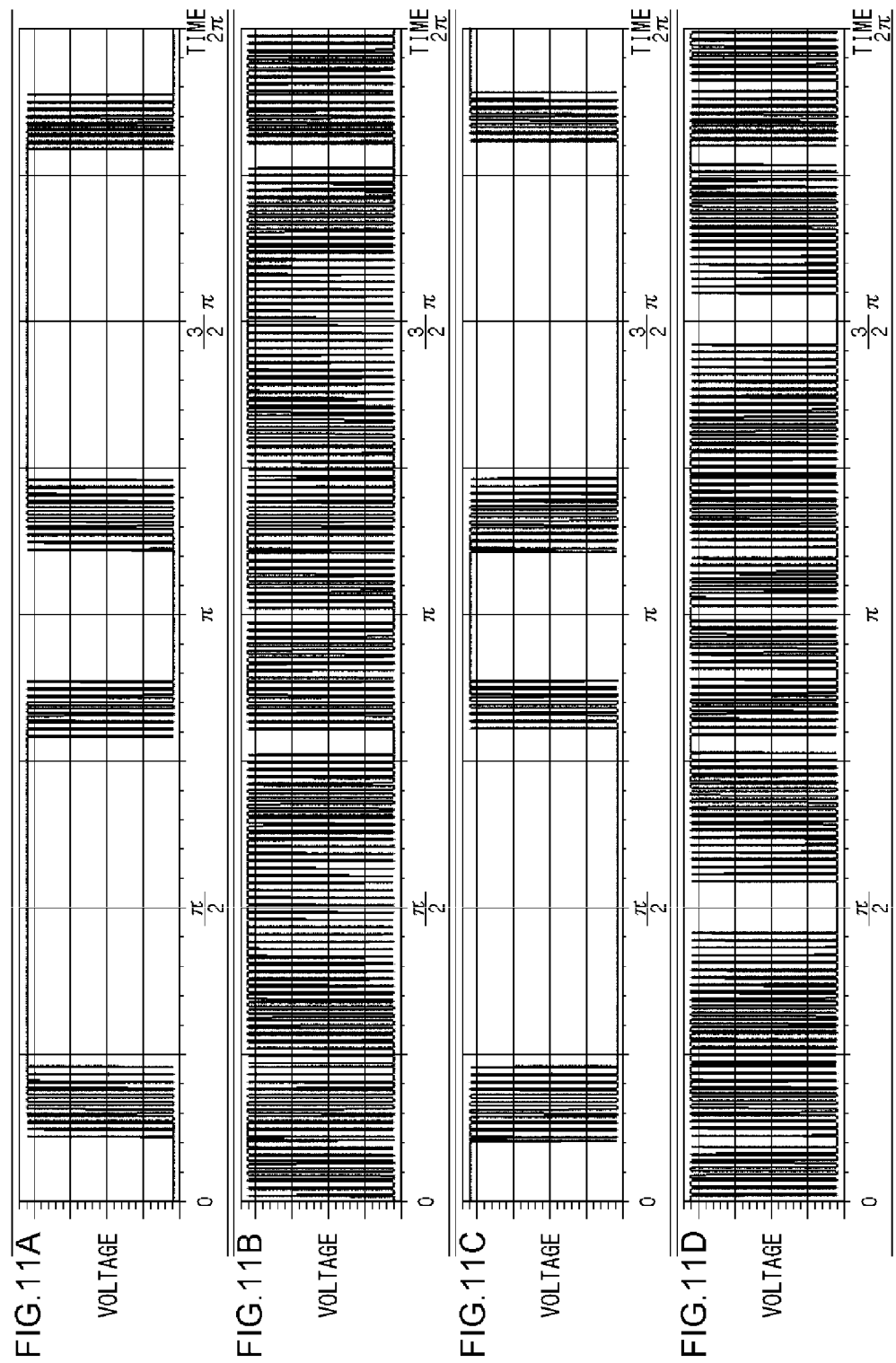
FIGS. 11A to 11D show simulation results of waveforms outputted from absolute-value setting switches of the inverter shown in FIG. 8.

FIGS. 11A to 11D show simulation results of waveforms outputted from the absolute-value setting switches of the inverter 220. FIG. 11A shows an output from the first absolute-value setting switch Q0. FIG. 11B shows an output from the second absolute-value setting switch Q3. FIG. 11C shows an output from the third absolute-value setting switch Q5. FIG. 11D shows an output from the fourth absolute-value setting switch Q6.

Figure 12:
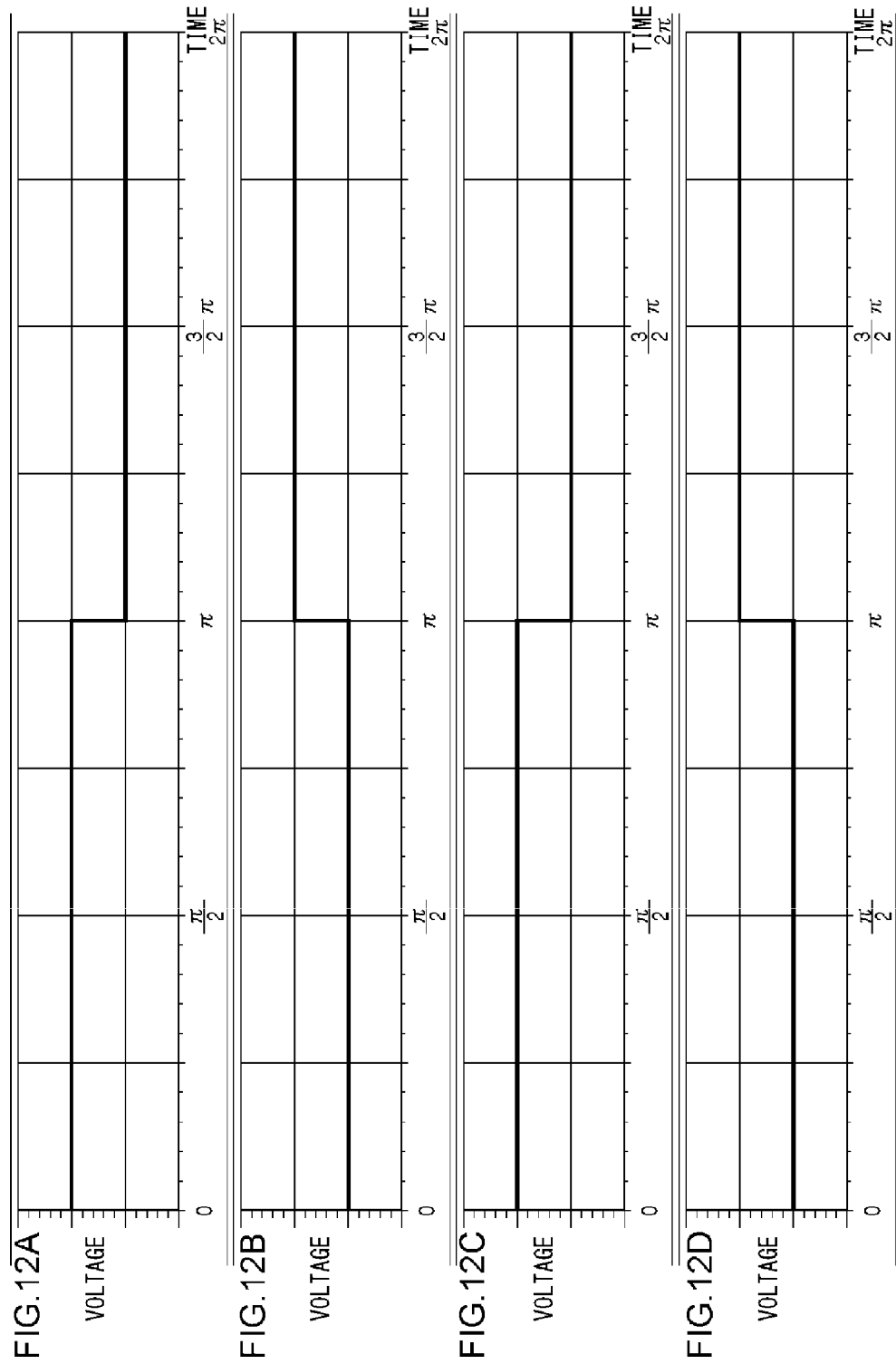
FIGS. 12A to 12D show simulation results of waveforms outputted from polarity setting switches of the inverter shown in FIG. 8.
Figure 13:
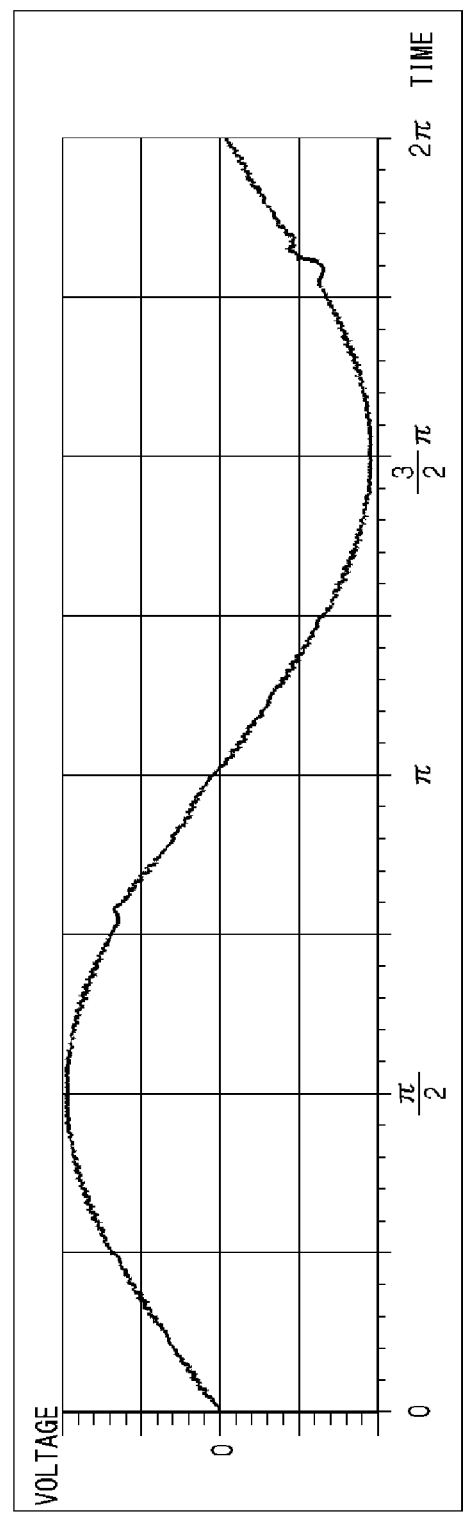
FIG. 13 shows a simulation result of waveform outputted from the inverter shown in FIG. 8.

FIGS. 12A to 12D show simulation results of waveforms outputted from the polarity setting switches of the inverter 220. FIG. 12A shows an output from the first polarity setting switch R1. FIG. 12B shows an output from the second polarity setting switch R2. FIG. 12C shows an output from the third polarity setting switch R3. FIG. 12D shows an output from the fourth polarity setting switch R4. As shown in FIGS. 12A to 12D, each voltage changes from a high level to a low level or it changes from a low level to a high level at time "$\pi$", which represents timing at which the polarity of a quasi sinusoidal wave changes. FIG. 13 shows a simulation result of waveform outputted from the inverter 220. Time axis corresponds to those of FIGS. 11A to 11D and FIGS. 12A to 12D.

By employing the examples of the present disclosure, different switches are used for the generation of amplitude of quasi sinusoidal wave and the generation of polarity of thereof, respectively. Thus, a switch or switches having a characteristic suitable for a given processing content can be used. Also, since the switch or switches having a characteristic suitable for the processing content is/are used, the optimum switches in terms of the performance and cost can be used. Also, since the polarity setting switches are switched with timing at which the polarity changes, they can be switched only when the amplitude is small. Also, since the polarity setting switches can be switched while the amplitude is small, switches, whose switching speed is slower than that of the absolute-value setting switches, can be used for the polarity setting switches. Also, since the switches whose switching speed is slower are used, the cost can be reduced. Also, since the polarity setting switches are switched while the amplitude is small, switches, whose breakdown voltage is lower than that of the absolute-value setting switches, can be used for the polarity setting switches. Also, the switches, which are low in breakdown voltage, are used, the cost can be reduced.

Also, the switches having a characteristic suitable for a given processing content are used, so that a gate driver according to the switch can be used. Also, a low-side gate driver can be used for a slow switch. Also, since the low-side gate driver is used, the cost can be reduced. Also, a common gate driver is used for a plurality of polarity setting switches, so that the number of gate drivers used can be reduced. Also, since the number of gate drivers used is reduced, the cost can be reduced.

The present disclosure has been described based on the examples. The examples are intended to be illustrative only, and it is understood by those skilled in the art that various modifications to constituting elements or an arbitrary combination of each process could be further developed and that such modifications are also within the scope of the present disclosure.

In the examples of the present disclosure, the absolute-value setting switch generates the potential difference (E1−E2) based on the difference between the voltage E1 and the voltage E2. However, this should not be considered as limiting and, for example, the absolute-value setting switch may generate a potential (E1+E2) based on the sum of the voltage E1 and the voltage E2. In other words, a voltage, which differs from the voltage E1 and voltage E2, may be generated by a combination of the voltage E1 and the voltage E2. According to this modification, various kinds of absolute values can be generated.

In the examples of the present disclosure, it is assumed that the voltage E2 is less than the potential difference (E2−E1) (i.e., E2>(E2−E1)). However, this should not be considered as limiting and, for example, the potential difference (E2−E1) may be less than the voltage E2 (i.e., (E2−E1)<E2). In this modification, the setting of voltages can be designed more freely.

In the examples of the present disclosure, the inverter 220 produces seven different levels of quasi sinusoidal waves from the first DC power supply V1 and the second DC power supply V2. However, this should not be considered as limiting and, for example, the inverter 220 may produce eleven different levels of quasi sinusoidal waves using a third DC power supply V3 in addition to the first DC power supply V1 and the second DC power supply V2. Furthermore, the inverter 220 may produce more than eleven different levels of quasi sinusoidal waves using four or more DC power supplies. In this modification, a further smoother quasi sinusoidal wave can be generated.

One generic example of the present disclosure is summarized as follows. An inverter converts a DC power supplied from each of a plurality of mutually different DC power supplies into an AC power formed by a quasi sinusoidal wave and outputs the thus converted AC power, and the inverter includes: a plurality of switches of first type configured to be switched to generate an absolute value of AC power by using a combination of a power-supply voltage supplied from each DC power supply and a voltage generated from a voltage supplied from each DC power supply; a plurality of switches of second type configured to be switched to generate a polarity of AC power; and a control unit configured to control the switching of the plurality of switches of first type and the plurality of switches of second type to generate a gradation voltage of quasi sinusoidal wave to be outputted. The control unit switches the plurality of switches of second type with timing at which the polarity of quasi sinusoidal wave changes, and the control unit keeps the plurality of switches of second type turned on, during the remaining time period of the quasi sinusoidal wave.

According to this generic example, mutually different switches are used between the generation of amplitude of quasi sinusoidal wave and the generation of polarity of thereof, so that the optimum switches in terms of the performance and cost can be used.

The respective switching speeds of the plurality of switches of second type may be lower than the respective switching speeds of the plurality of switches of first type. Or alternatively, the respective switching speeds of the plurality of switches of second type may be lower than the respective switching speeds of the plurality of switches of first type, and the plurality of switches of second type may be driven by low-side gate drivers. In such a case, slower switches are used and therefore the cost can be reduced.

The control unit may switch the plurality of switches of first type in such a manner that, during a ¼ cycle of an AC output, an output voltage changes in the order of a potential difference (0) between power-supply voltages E2 and E2 from a second DC power supply, a power-supply voltage E2, a potential difference (E1−E2) between a power-supply voltage E1 from a first DC power supply and a power-supply voltage E2, and a power-supply voltage E1, and the control unit may continue to keep turning on one of the plurality of switches of first type when a change is made from the potential difference (0) to the power-supply voltage E2, and the control unit continues to keep turning on another one of the plurality of switches of first type when a change is made from the potential difference (E1−E2) to the power-supply voltage E1.

What is claimed is:

1. An inverter for applying a quasi-sinusoidal wave as a voltage output to a load, comprising:
   a first switch, a second switch, a third switch, and a fourth switch;
   a first polarity setting switch, a second polarity setting switch, a third polarity setting switch, and a fourth polarity switching switch; and
   a control unit, wherein
   a first terminal of the first switch is connected to a first power supply,
   a second terminal of the first switch is connected to a first terminal of the first polarity setting switch and a first terminal of the second polarity setting switch,
   a second terminal of the first polarity setting switch is connected to a second terminal of the fourth polarity setting switch,
   a second terminal of the second polarity setting switch is connected to a second terminal of the third polarity setting switch,
   a first terminal of the second switch is connected to a first terminal of the third polarity setting switch and a first terminal of the fourth polarity setting switch,
   a second terminal of the second switch is connected to ground,
   a first terminal of the third switch and a first terminal of the fourth switch are connected to a second power supply,
   a second terminal of the third switch is connected to the first terminal of the first polarity setting switch and the first terminal of the second polarity setting switch,
   a second terminal of the fourth switch is connected to the first terminal of the third polarity setting switch and the first terminal of the fourth polarity setting switch,
   a first terminal of a load is connected to a path that connects the second terminal of the first polarity setting switch and the second terminal of the fourth polarity setting switch,
   a second terminal of the load is connected to a path that connects the second terminal of the second polarity setting switch and the second terminal of the third polarity setting switch, and
   the control unit is configured to generate a quasi-sinusoidal wave having a first voltage E1 from the first power supply, a second voltage E2 from the second power supply, and a voltage difference (E1−E2) between the first voltage E1 and the second voltage E2, by controlling the first switch, the second switch, the third switch, the fourth switch, the first polarity setting switch, the second polarity switching switch, the third polarity setting switch, and the fourth polarity setting switch, and applying the generated quasi-sinusoidal wave to the load.

2. The inverter according to claim 1, wherein the control unit is configured to repeatedly generate:
- a first period in which a voltage smaller than any of the first voltage E1, the second voltage E2, and the voltage difference (E1−E2) is applied to the load;
- a second period in which the second voltage E2 is applied to the load;
- a third period in which the voltage difference (E1−E2) is applied to the load; and
- a fourth period in which the first voltage E1 is applied to the load, by controlling the first switch, the second switch, the third switch, and the fourth switch, thereby changing an amplitude of the quasi-sinusoidal wave, and the control unit is configured to change a polarity of the quasi-sinusoidal wave by controlling, in the first period, the first polarity setting switch, the second polarity setting switch, the third polarity setting switch, and the fourth polarity setting switch.

3. The inverter according to claim 2, wherein the control unit is further configured to:
- generate a positive polarity period in which the polarity of the quasi-sinusoidal wave is positive, by turning the first polarity setting switch and the third polarity setting switch on and turning the second polarity setting switch and the fourth polarity setting switch off,
- generate a negative polarity period in which the polarity of the quasi-sinusoidal wave is negative, by turning the first polarity setting switch and the third polarity setting switch off and turning the second polarity setting switch and the fourth polarity setting switch on, and
- switch between the positive polarity period and the negative polarity period during the first period.

4. The inverter according to claim 3, wherein the first voltage E1 and the second voltage E2 meet a relationship E2>(E1−E2)>E2, and
the control unit is further configured to:
- generate a positive polarity voltage output, which is a part of the quasi-sinusoidal wave, by generating, in the positive polarity period, the second period, the third period, the fourth period, the third period, and the second period in the stated order,
- generate the first period after generating the positive polarity voltage output, and switches from the positive polarity period to the negative polarity period during the first period, and
- generate a negative polarity voltage output, which is a part of the quasi-sinusoidal wave, by generating, in the negative polarity period, the second period, the third period, the fourth period, the third period, and the second period in the stated order.

5. The inverter according to claim 4, wherein the control unit is further configured to:
- generate the first period by turning the third switch and the fourth switch on and turning the first switch and the second switch off,
- generate the second period by turning the second switch and the third switch on and turning the first switch and the fourth switch off,
- generate the third period by turning the first switch and the fourth switch on and turning the second switch and the third switch off, and
- generate the fourth period by turning the first switch and the second switch on and turning the third switch and the fourth switch off.

6. The inverter according to claim 5, wherein the control unit is configured to keep the third switch on during the first through second period to generate the first period and the second period in succession.

7. The inverter according to claim 6, wherein the control unit is configured to keep the first switch on during the third through fourth period to generate the third period and the fourth period in succession.

* * * * *